(12) United States Patent
Da Palma et al.

(10) Patent No.: US 6,892,331 B2
(45) Date of Patent: May 10, 2005

(54) METHOD AND SYSTEM FOR ERROR DETECTION IN A MANAGED APPLICATION ENVIRONMENT

(75) Inventors: William V. Da Palma, Coconut Creek, FL (US); Bruce D. Lucas, Mohecan Lake, NY (US); Wendi L. Nusbickel, Boca Raton, FL (US)

(73) Assignee: International Business Machines Corporation, Armonk, NY (US)

(*) Notice: Subject to any disclaimer, the term of this patent is extended or adjusted under 35 U.S.C. 154(b) by 554 days.

(21) Appl. No.: 10/052,454

(22) Filed: Jan. 17, 2002

(65) Prior Publication Data

US 2003/0135781 A1 Jul. 17, 2003

(51) Int. Cl.[7] ................................................ G06F 11/00
(52) U.S. Cl. ........................................ 714/55; 714/23
(58) Field of Search ..................... 714/23, 55; 709/100, 709/101, 104, 106

(56) References Cited

U.S. PATENT DOCUMENTS

| | | | | |
|---|---|---|---|---|
| 5,278,976 A | * | 1/1994 | Wu | 714/55 |
| 5,421,013 A | | 5/1995 | Smith | 395/650 |
| 5,442,758 A | | 8/1995 | Slingwine et al. | 395/375 |
| 5,768,572 A | | 6/1998 | George et al. | 395/557 |
| 5,796,633 A | | 8/1998 | Burgess et al. | 364/551.01 |
| 5,961,584 A | | 10/1999 | Wolf | 709/103 |
| 6,157,928 A | | 12/2000 | Sprenger et al. | 707/103 |
| 6,182,238 B1 | * | 1/2001 | Cooper | 714/2 |
| 6,493,741 B1 | * | 12/2002 | Emer et al. | 718/107 |
| 6,584,587 B1 | * | 6/2003 | McDermott | 714/55 |
| 6,697,935 B1 | * | 2/2004 | Borkenhagen et al. | 712/228 |
| 2003/0037294 A1 | * | 2/2003 | Robsman et al. | 714/55 |

FOREIGN PATENT DOCUMENTS

| | | | |
|---|---|---|---|
| JP | 08-263325 | 10/1996 | G06F/11/30 |
| JP | 09-179754 | 7/1997 | G06F/11/30 |

OTHER PUBLICATIONS

A. Lopez, *Java Tip 18: Implementing a Timeout Feature for the JDK 1.0.2 DatagramSocket: How to Time and Unblock the Receiving of a Datagram Packet*, www.JavaWorld.com, (Oct. 2, 2000).

Metzger, AmpelSimulator, <http://galway.informatik.uni--kl.de/staff/metzger/Praktikum/javadoc/all/index-all.html>, (visited Dec. 4, 2000).

*Class util. Timer*, <http://www.aim.aol.com/javadev/java-doc/util.Timer.html>, (visited Dec. 4, 2000).

G. Coulson, *GOPI: A Distributed Object Platform Infrastructure for Multimedia Applications*, <http://tina.lanc-s.ac.uk/computing/users/geoff/GOPI/GOPI_Paper1.html>, (visited Dec. 4, 2000).

* cited by examiner

*Primary Examiner*—Scott Baderman
(74) *Attorney, Agent, or Firm*—Akerman Senterfitt

(57) ABSTRACT

A method of managing at least one client computer program in a managed application environment can include receiving a request from at least one of a plurality of client computer programs to begin a timer. The timer can correspond to an identified task of the client computer program which has been identified as a time-out susceptible task, and which is executing within a particular thread of execution of the client computer program. The timer corresponding to the request and the time-out susceptible task can be selectively started in a separate thread of execution. The identified task can be timed. If the timer expires, a recovery action can be performed corresponding to the time-out susceptible task.

25 Claims, 4 Drawing Sheets

METHOD AND SYSTEM FOR ERROR DETECTION IN A MANAGED APPLICATION ENVIRONMENT

BACKGROUND OF THE INVENTION

1. Technical Field

This invention relates generally to system management of computer programs, and more particularly, to detecting error conditions such as time-outs within computer programs.

2. Description of the Related Art

A system management (SM) agent is responsible for monitoring and controlling various computer programs, performing failure recovery, and improving overall system reliability. In particular, SM agents can detect different error conditions within computer programs and computer program processes. Conventional solutions for managing system resources have incorporated a variety of mechanisms. One solution has been to identify system processes which have become idle and are no longer in use. For example, U.S. Pat. No. 6,157,928 to Sprenger et. al. teaches that system resources can be managed or released by destroying particular agent processes which have been idle for a certain period of time. Other systems attempt to monitor for error conditions by monitoring the amount of time a particular process requires for execution. For example, Japanese Patent No. JP 09-179754 discloses a control mechanism for an operating system which can detect when a process has taken too long to complete. Similarly, Japanese Patent No. JP 08-263325 discloses a method of detecting a timeout condition and releasing resources in a client-server solution to prevent overload of the server.

While many management systems have focused upon the concept of monitoring system processes, such solutions fall short with respect to managing multi-threaded computer programs. For example, a process can include a plurality of individual tasks, each of which can execute within a separate thread of execution. Although conventional management systems can determine which process experienced an error, such systems offer little insight as to which task of a larger process is responsible for causing an error condition in a computer program.

One attempt at monitoring a computer program process is referred to as monitoring "heartbeats". A heartbeat can be a simple, low-priority thread of execution that is started when a computer program starts. The heartbeat continues to execute while the computer program executes. Periodically, the heartbeat sends a message to the SM agent, informing it that the computer program is still functioning properly. Typically, the SM agent expects a message within a certain amount of time or the SM agent will consider the computer to have entered a time-out or other error condition.

Heartbeat monitoring can provide an indication of when an entire computer program process has timed-out or experienced an error condition. Still, this technique does not work well within the context of multi-threaded computer programs. For example, heartbeats typically execute within individual threads of execution. Accordingly, one heartbeat does not reflect the fact that another thread of execution has timed-out. This can be the case despite the fact that both heartbeats can correspond to a common larger process.

Monitoring of heartbeats further requires additional system resources. This overhead can be burdensome on a system, and can be particularly wasteful in the case where a computer program itself is idle, but the heartbeat continues. In such cases, although the computer program consumes little if any resources, the monitoring of the computer program's heartbeat continues to consume system resources. A similar situation arises when a portion of a computer program that is unlikely to experience error conditions is continually monitored. Oftentimes, computer programs are subject to errors or time-outs only in particular isolated or critical phases of execution. For example, during an initialization phase, some computer programs can depend upon other local or remote components to complete a separate task or process. Thus, if the local or remote component times-out, the starting thread in the relying computer program can time-out as well. In these situations, where an error condition can be more likely to arise, monitoring of a task or process can be beneficial. Continued monitoring of a task or process when an error condition is unlikely to occur, however, can deplete system resources and cause decreased system performance.

SUMMARY OF THE INVENTION

The invention disclosed herein provides a method and system for managing computer programs. In particular, the invention can detect an error condition such as a time-out occurring within one or more computer programs under management. Specifically, the invention disclosed herein can detect a time-out condition occurring within a particular task executing within a specific thread of execution. Upon detection of such an error condition, the invention can initiate a suitable error recovery mechanism.

One aspect of the present invention can include a method of managing at least one client computer program in a managed application environment. The method can include receiving a request from at least one of a plurality of client computer programs to begin a timer. The timer can correspond to a task of the client computer program which has been identified as a time-out susceptible task. Notably, the identified task can execute within a particular thread of execution of the client computer program. A timer selectively can be started in another separate thread of execution or a process separate from said time-out susceptible task. The timer can correspond to the request and the time-out susceptible task. The time-out susceptible task can be timed and if the timer expires, a recovery action corresponding to the time-out susceptible task can be performed. The recovery actions can include destroying the particular thread of execution, restarting the identified task, and forcing the client computer program to discontinue execution.

In another embodiment of the invention, the identified task can be part of a process of the client computer program. In that case, the recovery mechanism can include destroying the process and restarting the process. Additionally, the method can include receiving a request from the client computer program to stop the timer.

Another embodiment of the invention can include a method of managing at least one client computer program in a managed application environment. The method can include identifying a process of a client computer program, wherein the process includes at least one time-out susceptible task executing in a particular thread of execution. Named timers can be defined which correspond to the time-out susceptible tasks. A request to enable one of the timers can be received from the client computer program. The request can specify a particular one of the timers corresponding to the time-out susceptible task which the client computer program has started to execute. The particular one of the timers can be enabled and a hash table entry for the particular one of the timers can be created. The time-out susceptible task can be timed wherein the timer executes within a separate thread of execution or within a process separate from the identified process. If the enabled timer expires, the process can be destroyed in the client computer program. In that case, the process can be restarted in the client computer program. Still, a request to stop the particular one of the timers can be received from the client computer program.

Another aspect of the invention can include a system management agent for managing a plurality of client computer programs. The system can include a plurality of predetermined, named timers. Each one of the timers can correspond to a time-out susceptible task of one of the computer programs and can have a predetermined maximum allowable time period. A application programming interface can be included which can be accessible by the plurality of computer programs for receiving requests to enable and disable particular ones of the plurality of timers. The system can include a configuration file which can associate the plurality of timers and the identified tasks. The configuration file also can specify the maximum allowable time periods and define one or more recovery mechanisms for each time-out susceptible task. The system management agent also can include a hash table for tracking enabled timers of the plurality of timers. The system also can include a recovery component for coordinating the plurality of timers, the application programming interface, the configuration file, and the hash table. The recovery component further can implement a defined recovery mechanism for time-out susceptible tasks having an expired timer.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a method and system for managing computer programs. In particular, the invention provides a component as part of a system management (SM) agent which can detect an error condition such as a time-out occurring within one or more computer programs under management. Rather than detecting time-out conditions with respect to various processes within the computer programs, the invention disclosed herein can detect a time-out condition occurring within a particular task executing within a specific thread of execution of a computer program. Notably, a process, as used herein, can include a plurality of tasks each operating within a separate thread of execution. Upon detection of such an error condition, the invention can initiate a suitable error recovery mechanism.

In accordance with the inventive arrangements disclosed herein, particular tasks which execute within separate threads of execution can be designated as being likely to experience an error condition. For such tasks, a time period can be specified during which the task is expected to complete execution. If a task does not complete within the specified time period, the particular thread of execution and task can be identified. Moreover, a recovery mechanism suited to the identified thread and task can be implemented. Accordingly, the invention can be particularly suited for use with multi-threaded computer programs and can be used for recovery and management of Java resources.

Figure 1:
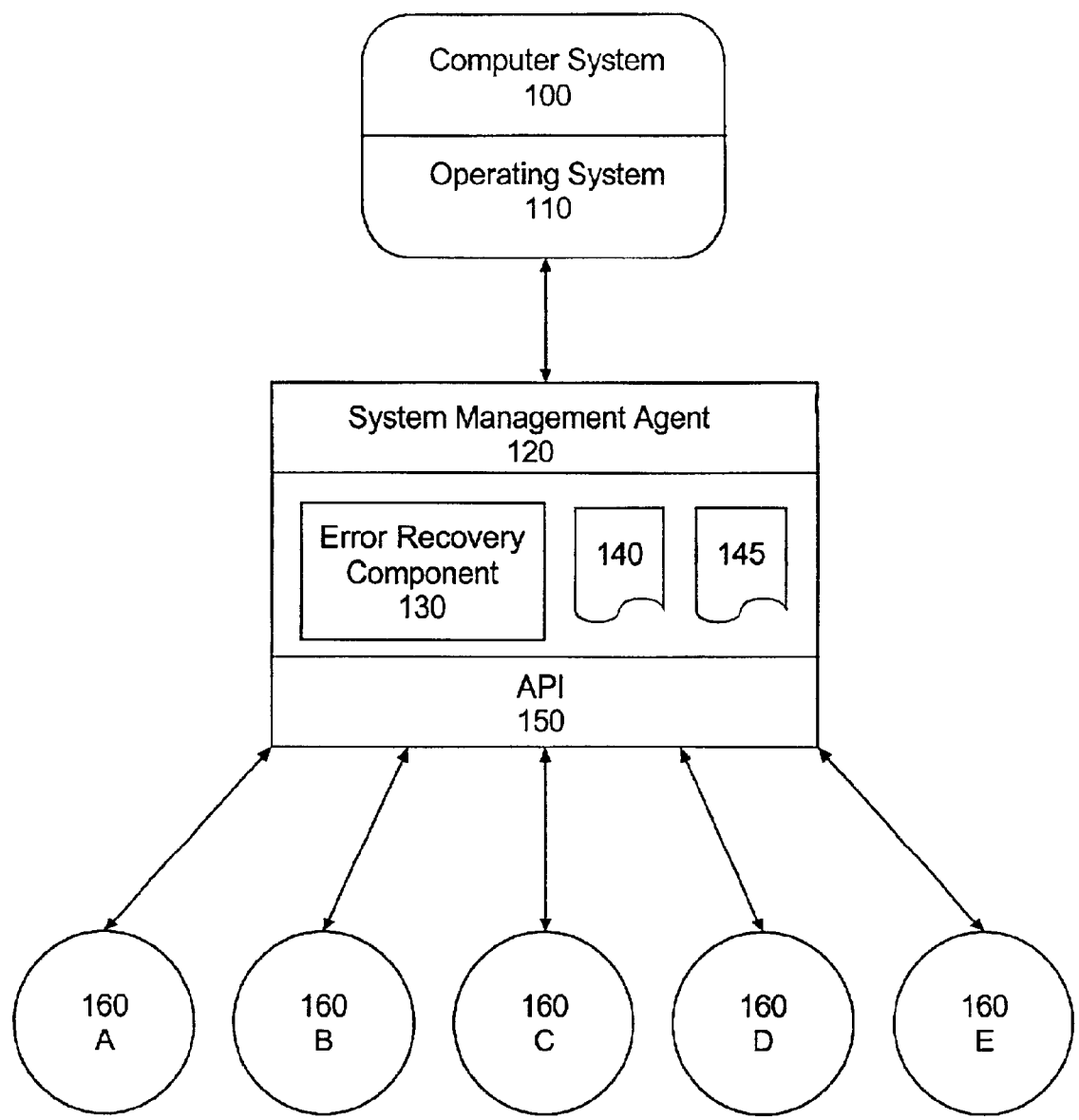
FIG. 1 is a schematic diagram illustrating an exemplary computer architecture for a system of managing one or more computer programs in accordance with the inventive arrangements disclosed herein.

FIG. 1 is a schematic diagram illustrating an exemplary computer architecture for a system of managing one or more client computer programs in accordance with the inventive arrangements disclosed herein. As shown in FIG. 1, a computer system 100 can be provided having an operating system 110 and an SM agent 120 for managing a plurality of computer programs 160A through 160E.

The memory of computer system 100 can include an operating system 110 and an SM agent 120. As shown in FIG. 1, the SM agent 120 can include an error recovery component 130, a configuration file 140, a hash table 145, as well as an application programming interface (API) 150. Generally, the SM agent 120 is responsible for monitoring and controlling various computer programs, such as computer programs 160A through 160E. Notably, the computer programs 160A through 160E can include one or more VoiceXML browsers. The SM agent 120 can perform functions commonly associated with a SM agent such as failure recovery which can improve overall system reliability. For example, the SM agent 120 can detect timeout conditions occurring within the computer programs 160A through 160E. Rather than detecting time-out conditions with respect to various processes within the computer programs 160A through 160E, wherein a process can include a plurality of tasks each operating within a separate thread of execution, the SM agent 120 can detect time-out conditions occurring within particular tasks executing within a specific thread of execution.

The configuration file 140 can specify a plurality of timers. The timers can be associated with particular processes within the computer programs 160A through 160E. More specifically, the timers can be associated with particular tasks of the processes, and thus can correspond to the thread of execution that is spawned to accommodate the particular task. The configuration file 140 further can include a maximum time period in which each task is to complete execution. In addition to specifying maximum time periods, the configuration file 140 can specify a recovery mechanism to be performed in the case where a particular task does not complete execution within the allotted time period. For example, such recovery mechanisms can include destroying the thread of execution, restarting the task, returning an error condition to another process or task, as well as reloading portions of memory with code or data as specified by the recovery mechanism.

It should be appreciated by those skilled in the art that the particular recovery mechanism implemented for a particular task can be task or process dependent. For example, a developer, having identified a particular task as being likely to experience a time-out condition or otherwise being important as affecting overall system operation or performance, can determine a reasonable time period in which the task should complete operation. Further, the developer can determine a suitable recovery mechanism to implement in the event that the particular task does not complete execution within the specified time period. Still, these determinations can be made by a system administrator. In that case, the system administrator can access the configuration file and make updates within the scope allowable by the SM agent 120 as necessary. In any case, the invention disclosed herein enables the application, in effect, to determine which phases of execution are susceptible to error and deal with those phases accordingly.

The error recovery component 130 can start timers, reset timers, implement a designated recovery mechanism in the case where a task does not complete execution within the allotted time period, and coordinate operation of components of the SM agent 120 with requests received by the API 150. The hash table 145 can be used to track enabled timers. For example, the error recovery component 130 of the SM agent can make an entry in the hash table 145 for each enabled timer. The API 150 can provide an interface to the SM agent 120 and the computer programs 160A through 160E. In particular, the API 150 can provide specific calls for starting timers and stopping timers which can be accessed by computer programs 160A through 160E.

The aforementioned components can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. As mentioned, a typical combination of hardware and software can be a general purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

Computer program or application in the present context means any expression, in any language, code or notation, of a set of instructions intended to cause a system having an information processing capability to perform a particular function either directly or after either or both of the following: a) conversion to another language, code or notation; b) reproduction in a different material form. The present invention can be suited for managing Java resources. Accordingly, the invention can be implemented using Java Management Extensions (JMX). For example, a JMX management bean interface, also referred to as an "M-Bean", can be used to start and stop timers. Still, the invention is not so limited and can be implemented using any of a variety of other programming languages capable of implementing the configurations disclosed herein.

Figure 2:
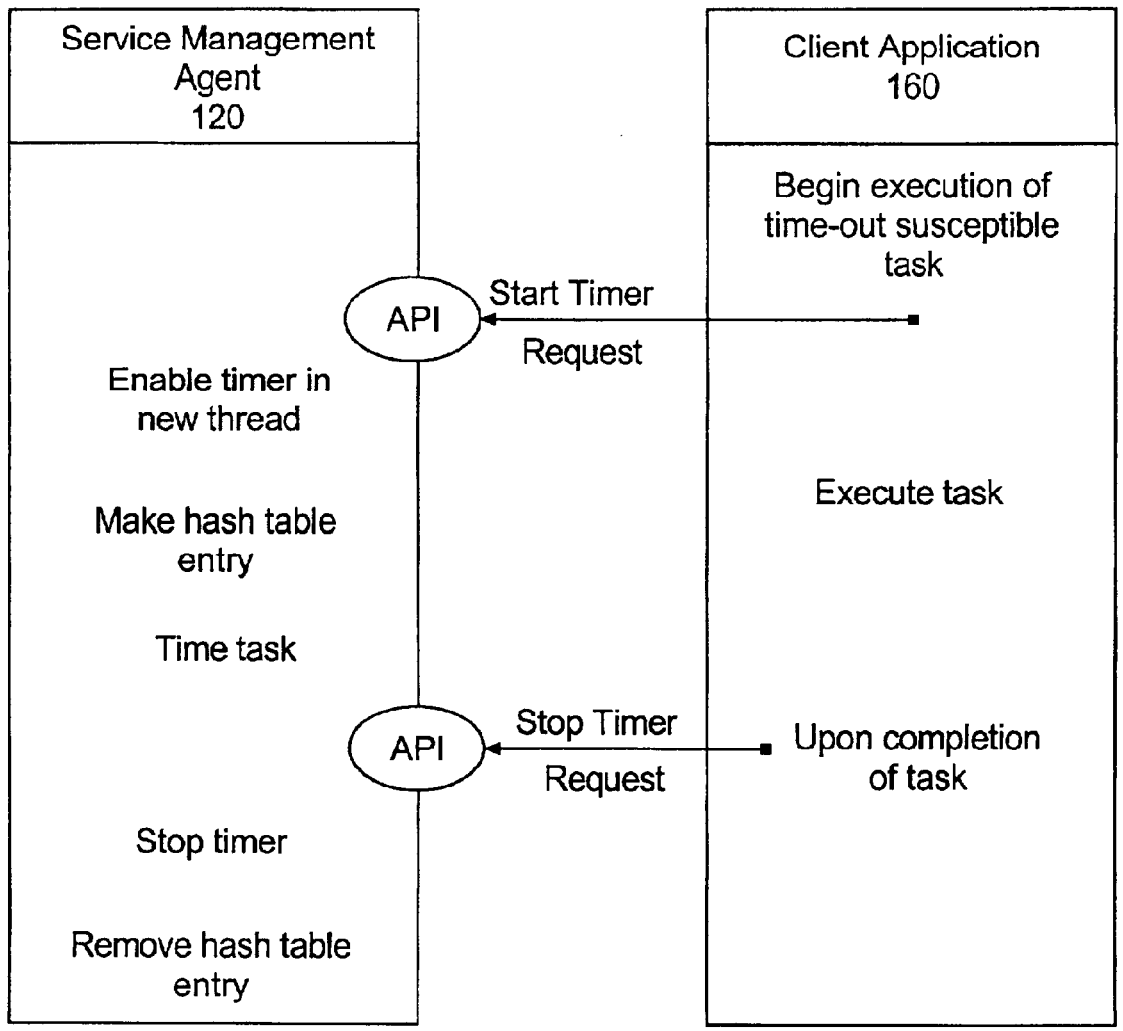
FIG. 2 is a pictorial representation illustrating an exemplary message flow of the invention disclosed herein.

FIG. 2 is a pictorial representation illustrating an exemplary message flow of the invention disclosed herein. As shown in FIG. 2, the SM agent 120 can receive requests to start timers from the client application 160. In operation, client application 160 can begin operation of a time-out susceptible task. Notably, the time-out susceptible task can include an identifier within the code. For example, the identifier can initiate a call or request to the SM agent 120 to start a particular timer corresponding to the task which is beginning execution. More particularly, the task can include an identifier which can be a call via the API of the SM agent 120 to access the timer defined and corresponding to the particular task being executed. Such functionality can be available through a "start timer request" function published by the API of the SM agent.

Once the request to start a particular timer is received by the SM agent 120, the timer can be enabled and configured according to the parameters defined within the configuration file. For example, the SM agent 120 can begin a "timer" thread which can sleep for the number of seconds specified by the timer properties in the configuration file. Still, the timer can be implemented within a process separate from the time-out susceptible task such that if the task experiences an error condition, it will not likely affect the timer. Although FIG. 2 depicts a single timer being enabled, it should be appreciated that multiple timers having different names can be enabled. The SM agent 120 further can make a hash table entry corresponding to the enabled timer.

As the SM agent 120 continues to monitor the time-out susceptible task, the client application 160 can continue to execute the time-out susceptible task. If the time-out susceptible task completes execution before the timer expires, the client application 160 can send a "stop timer request" to the SM agent 120. For example, when the client program exits a time-out susceptible section of code, the "stop timer request" function, which can be published by the API, can be accessed through the API of the SM agent. Accordingly, the timer can be stopped and the entry in the hash table corresponding to the timer can be removed. If the timer expires, however, the SM agent can implement a specified recovery mechanism.

Figure 3:
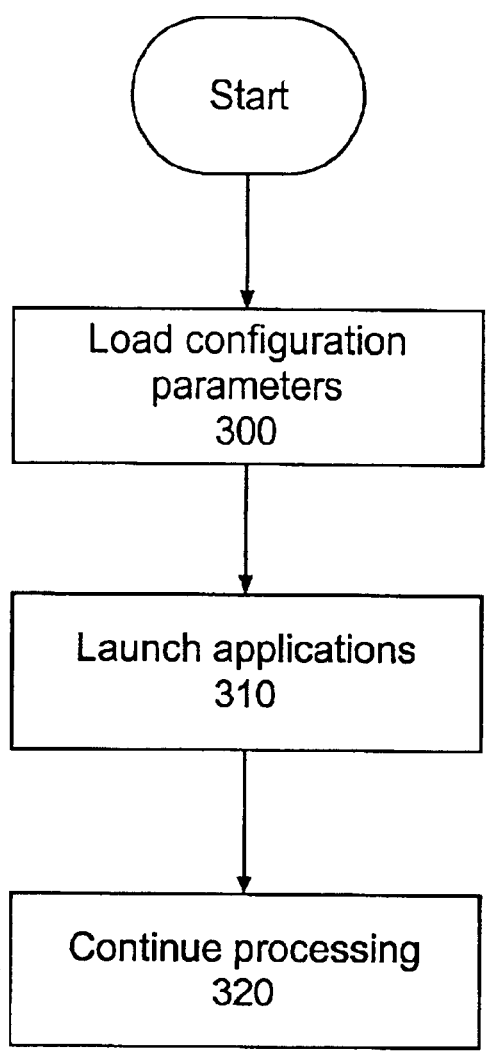
FIG. 3 is a flow chart illustrating an exemplary method of initializing the inventive arrangements disclosed herein.

FIG. 3 is a flow chart illustrating an exemplary method of initializing the system of FIG. 1. The initialization method can begin in step 300 by loading parameters of the configuration file. For example, timers, corresponding maximum time periods, pointers to recovery mechanisms, or actual recovery mechanisms can be loaded. Each of the aforementioned parameters can be associated with a particular task of a process. In step 310, the client computer programs managed by the SM agent can be launched. In step 320, the system can begin to monitor the launched computer programs and continue monitoring the computer programs until such time when an error condition arises.

Figure 4:
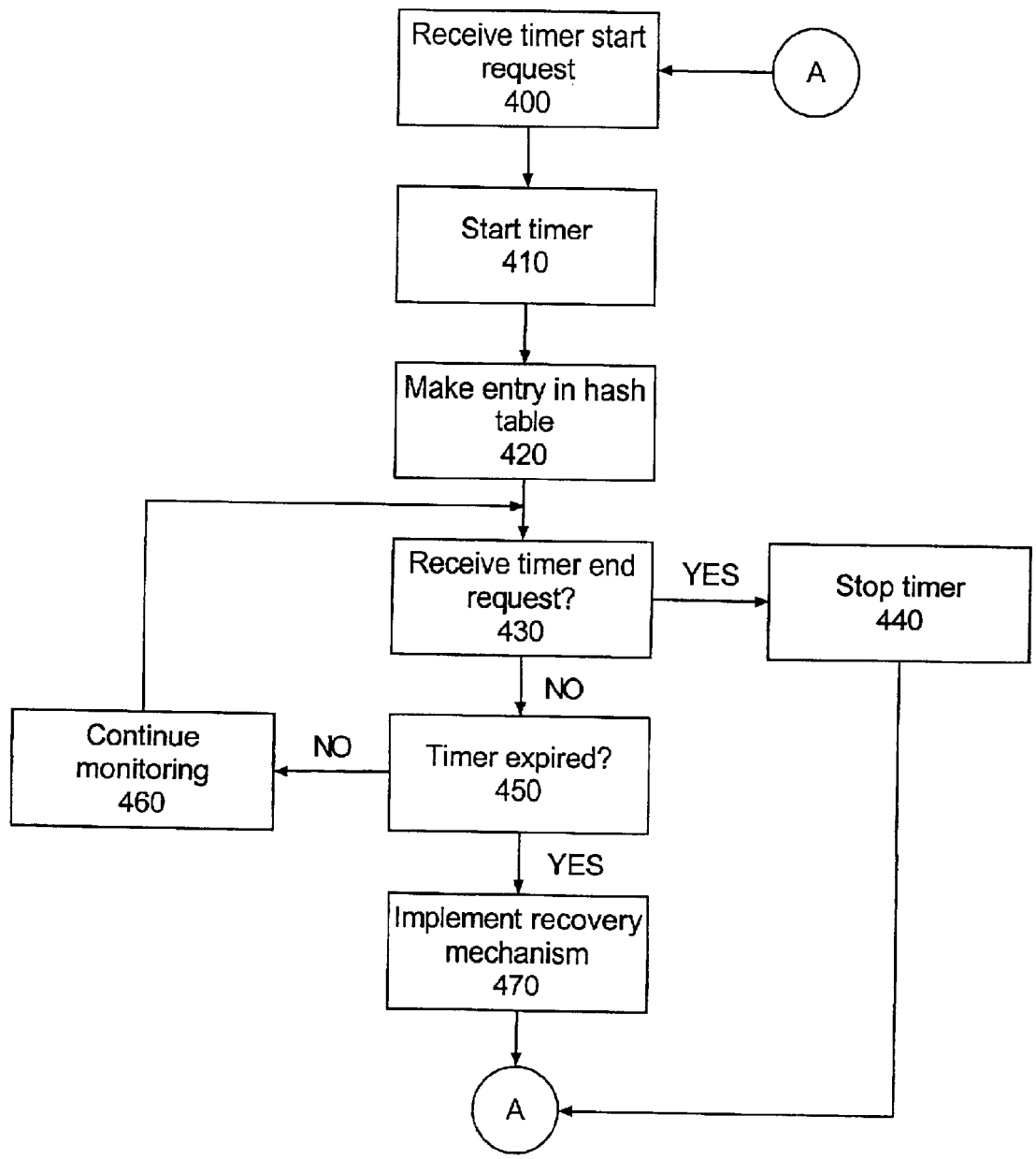
FIG. 4 is a flow chart illustrating an exemplary method of detecting error conditions in accordance with the inventive arrangements disclosed herein.

FIG. 4 is a flow chart illustrating an exemplary method of detecting error conditions in accordance with the inventive arrangements disclosed herein and as performed by the SM agent. The method can begin in a state wherein the plurality of client computer programs have been launched and are executing. For example, a computer program such as a VoiceXML browser can execute code and upon identifying a marked portion of code, can implement the method of FIG. 4. In step 400, a request for starting a timer can be received. For example, a computer program can begin a task or process of multiple tasks, some of which can be marked as being likely to experience an error condition. Accordingly, that computer program can request that a particular timer corresponding to one or more of the tasks be started. In this manner, the computer program can make a call to the SM agent via the API to begin a timer corresponding to the marked task.

In step 410, the requested timer can be started. In one embodiment of the present invention, a timer thread can be started which can "sleep" for a duration specified by a timer property in the configuration file, for example, the maximum time period allowable for the corresponding task to execute. Still, the timer can be implemented within a process separate from the time-out susceptible task such that if the task experiences an error condition, it will not likely affect the timer. In step 420, a hash table entry can be made corresponding to the enabled timer so that the enabled timer can be monitored. In step 430, as the timer continues, it can be determined whether a message to stop or discontinue the timer has been received. If so, the method can continue to step 440 where the timer thread can be stopped or reset. Accordingly, the method can continue to jump circle A to restart the method. If no message to stop the timer is received, however, the method can continue to step 450.

In step 450, if the timer has not expired, the method can continue to step 460 to continue monitoring the various computer programs. In that case, the method can continue to step 430 to continually monitor for a timer end message and a timer expiration condition. If, however, the timer has expired in step 450, the method can continue to step 470 to implement a recovery mechanism.

In step 470, the particular task which did not execute within the specified time period can be destroyed. Further, if so specified, the process including the identified task also can be destroyed. Additional recovery mechanisms can be implemented as previously discussed such as reloading code, data, or restarting a particular task, process, or application. After completion of step 470, the method can continue to step 400 to begin the process anew and repeat as necessary.

It should be appreciated by those skilled in the art that the process of FIG. 4 presents one embodiment of a method of detecting a time-out condition of a particular thread. Accordingly, the invention is not so limited to the particular arrangements disclosed herein. For example, multiple instantiations of the method of FIG. 4 can be implemented in a parallel fashion such that multiple timers can be started and monitored, each corresponding to a different task, process, and computer program. Another embodiment can include looping back to step 400 to continually monitor for subsequently received timer start requests. In that case, for each active timer, the method can monitor for received stop timer requests in step 430 and monitor for timer expirations in step 450. Still, this invention can be embodied in other forms without departing from the spirit or essential attributes thereof. Accordingly, reference should be made to the following claims, rather than to the foregoing specification, as indicating the scope of the invention.

What is claimed is:

1. A method of managing at least one client computer program in a managed application environment comprising:
   receiving a request from at least one of a plurality of client computer programs to begin a timer corresponding to an identified task executing within a particular thread of execution of said client computer program, wherein said identified task has been identified as a time-out susceptible task;
   starting a timer in another separate thread of execution which corresponds to said request and said time-out susceptible task;
   timing said time-out susceptible task; and
   if said timer expires, performing a recovery action corresponding to said time-out susceptible task.

2. The method of claim 1, wherein said timer executes within a process separate from said time-out susceptible task.

3. The method of claim 1, wherein said recovery action comprises destroying said particular thread of execution.

4. The method of claim 1, wherein said recovery action comprises restarting said time-out susceptible task.

5. The method of claim 1, wherein said time-out sensitive task is part of a process and said recovery action comprises destroying said process.

6. The method of claim 5, further comprising:
   restarting said process.

7. The method of claim 1, wherein said recovery action comprises forcing said client computer program to discontinue execution.

8. The method of claim 1, further comprising:
   receiving a request from said client computer program to stop said timer.

9. A method of managing at least one client computer program in a managed application environment comprising:
   identifying a process of a client computer program, wherein said process includes at least one time-out susceptible task executing in a particular thread of execution;
   defining named timers corresponding to said time-out susceptible tasks;
   receiving a request to enable one of said timers from said client computer program, wherein said request specifies a particular one of said timers corresponding to one of said time-out susceptible tasks which said client computer program has started to execute;
   enabling said particular one of said timers;
   creating a hash table entry for said particular one of said timers;
   timing said time-out susceptible task, wherein said timer executes within a separate thread of execution; and
   if said enabled timer expires, destroying said process in said client computer program.

10. The method of claim 9, wherein said timer executes in a process separate from said identified process.

11. The method of claim 9, further comprising:
    restarting said process in said client computer program.

12. The method of claim 9, further comprising:
    receiving a request to stop said particular one of said timers from said client computer program.

13. A system management agent for managing a plurality of client computer programs comprising:
    a plurality of timers, each said timer corresponding to a time-out susceptible task of one of said computer programs executing within a designated thread of execution and having a predetermined maximum allowable time period;
    an application programming interface accessible by the plurality of computer programs for receiving requests to enable and disable particular ones of said plurality of timers;
    a configuration file associating said plurality of timers with said time-out susceptible tasks, and specifying said maximum allowable time periods, and defining one or more recovery mechanisms for each said time-out susceptible task;
    a hash table for tracking enabled timers of said plurality of timers; and
    a recovery component for coordinating said plurality of timers, said application programming interface, said configuration file, and said hash table, wherein said recovery component initiates one of said recovery mechanisms for time-out susceptible tasks having expired timers.

14. A machine-readable storage, having stored thereon a computer program having a plurality of code sections executable by a machine for causing the machine to perform the steps of:
    receiving a request from at least one of a plurality of client computer programs to begin a timer corresponding to an identified task executing within a particular thread of execution of said client computer program, wherein said identified task has been identified as a time-out susceptible task;

starting a timer in another separate thread of execution which corresponds to said request and said time-out susceptible task;

timing said time-out susceptible task; and if said timer expires, performing a recovery action corresponding to said time-out susceptible task.

15. The machine-readable storage of claim 14, wherein said timer executes within process separate from said time-out susceptible task.

16. The machine-readable storage of claim 14, wherein said recovery action comprises destroying said particular thread of execution.

17. The machine-readable storage of claim 14, wherein said recovery action comprises restarting said identified task.

18. The machine-readable storage of claim 14, wherein said task is part of a process and said recovery action comprises destroying said process.

19. The machine-readable storage of claim 18, further comprising:

restarting said process.

20. The machine-readable storage of claim 14, wherein said recovery action comprises forcing said client computer program to discontinue execution.

21. The machine-readable storage of claim 14, further comprising:

receiving a request from said client computer program to stop said timer.

22. A machine-readable storage, having stored thereon a computer program having a plurality of code sections executable by a machine for causing the machine to perform the steps of:

identifying a process of a client computer program, wherein said process includes at least one time-out susceptible task executing in a particular thread of execution;

defining named timers corresponding to said time-out susceptible tasks;

receiving a request to enable one of said timers from said client computer program, wherein said request specifies a particular one of said timers corresponding to one of said time-out susceptible tasks which said client computer program has started to execute;

enabling said particular one of said timers;

creating a hash table entry for said particular one of said timers;

timing said time-out susceptible task, wherein said timer executes within a separate thread of execution; and if said enabled timer expires, destroying said process in said client computer program.

23. The machine-readable storage of claim 22, wherein said timer executes in a process separate from said identified process.

24. The machine-readable storage of claim 22, further comprising:

restarting said process in said client computer program.

25. The machine-readable storage of claim 22, further comprising:

receiving a request to stop said particular one of said timers from said client computer program.

* * * * *